United States Patent
Sattler

[15] 3,667,510
[45] June 6, 1972

[54] APPARATUS FOR WINDING COILS FOR ELECTRICAL MACHINES

[72] Inventor: Klaus-Dieter Sattler, 24 Lubeck, Luisenstrasse 3C, Germany

[22] Filed: Feb. 24, 1970

[21] Appl. No.: 13,336

[30] Foreign Application Priority Data

Mar. 7, 1969 Germany.................P 19 11 551.6-32

[52] U.S. Cl..........................................140/92.2, 242/77.1
[51] Int. Cl. .........................................................B21f 3/04
[58] Field of Search..................140/92.1, 92.2; 29/203, 605; 242/77.1

[56] References Cited

UNITED STATES PATENTS

| | | | |
|---|---|---|---|
| 957,991 | 5/1910 | McLeod | 242/77.1 |
| 1,045,410 | 11/1912 | Jenkins | 242/77.1 |
| 1,396,033 | 11/1921 | Francis | 140/92.2 |
| 2,878,855 | 3/1959 | Gakle et al | 29/605 |

Primary Examiner—Lowell A. Larson
Attorney—Polachek and Saulsbury

[57] ABSTRACT

In an apparatus for winding concentrically disposed coils, or groups of coils respectively, for electrical machines, wherein the coil wire is wound around the outer surfaces of coil carriers with differently dimensioned outer circumferences defining the widths of the coils, the invention resides in that the coil carrier for the coil of smallest width remains stationary during the winding operation, as is known per se, while its surface on which the wire is to be wound is arranged in parallel relation to the axis of winding, or the axis of the coil respectively, wherein the remaining coil carriers for supporting the coils of greater widths are arranged in pairs opposite to each other with respect to the winding axis, and are formed as hinged arms which are pivoted for each width of coil successively in pairs out of a position of rest, in which they do not interfere with the winding of the preceding coil carrier, into a working or winding position, in which the winding circumferences of all of the coil carriers are disposed parallel to each other and eccentrically or concentrically with respect to the winding axis.

9 Claims, 6 Drawing Figures

INVENTOR
KLAUS-DIETER SATTLER

INVENTOR
KLAUS-DIETER SATTLER
BY
Polachek & Saulsbury
ATTORNEYS

INVENTOR
KLAUS-DIETER SATTLER

APPARATUS FOR WINDING COILS FOR ELECTRICAL MACHINES

BACKGROUND OF THE INVENTION

1. Field of Application

As is well known, such winding apparatii are preferably used for winding stator coils which, with the aid of a suitable retraction device, are mounted in the stator grooves of electric machines. Prior, the wound coils, or groups of coils respectively, must be transferred from the winding apparatus to the retraction device.

2. Description of the Prior Art

The known winding apparatii are afflicted with considerable drawbacks since it is necessary to transfer the coils manually with the aid of pliers, or the like tools, to the retraction device causing loss of time, sources of error, and tool costs for the provision of the pliers. These disadvantages also occur if customary winding machines are used and the coils are wound in winding layers on corresponding jigs. Also winding apparatii are known, in which the coils are directly wound on the retraction device, but due to the complicated required mechanism the tool costs are very high.

Therefore, the general object of this invention is to provide a coil winding apparatus which is of simple construction, and moderate in price, and in which particularly the transfer of the wound coil from the retraction device is achieved in a safe and simple manner.

In an apparatus for winding concentrically disposed coils, or groups of coils respectively, for electric machines the invention resides in combination of:

a. a base structure;
b. support means and wire guide means mounted on said base structure;
c. drive means causing relative rotation between said support means and said wire guide means;
d. a first pair of coil carriers for the coil of smallest width, mounted stationarily on said support means projecting therefrom in spaced relation on opposite sides of the axis of rotation and having outer surfaces around which the wire is wound;
e. any required number of additional pairs of coil carriers, each pair for winding a coil of greater width and mounted pivotally on said support means in spaced relation on opposite sides of said axis of rotation movable successively in pairs out of a position of rest, in which they do not interfere the winding of the preceding coil, into an operating position, in which the winding circumferences of all coil carriers are disposed parallel to each other and to said axis of rotation;
f. actuating means for pivoting said additional pairs of coil carriers;
g. retracting means for removing said coils from said pairs of coil carriers engaging zones of each coil which remain exposed at their inner circumferences;
h. means for reducing the distance between said pairs of coil carriers, so as to release the winding tension of the coil wires and to facilitate the removal of the coils by said retraction means.

Further features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
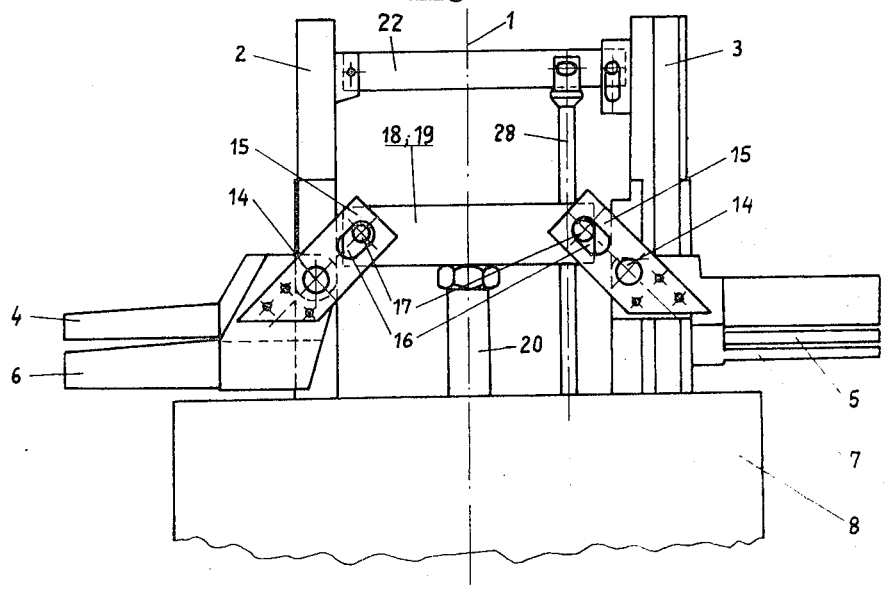
FIG. 1 is a side view of the winding apparatus in a position for winding the smallest coil.

Referring now to FIG. 1 of the drawings it will be seen that the coil carrier for the coil of smallest width to be wound first comprises two arms 2 and 3, arranged asymmetrically, or symmetrically to the winding axis 1, or coil axis respectively, and mounted on a support in any manner, either extending vertically upwardly, or horizontally, or suspending vertically downwardly therefrom. Right from the start this coil carrier is in its winding position in which the outer surfaces of the legs 2 and 3, on which the coil is to be wound, extend in parallel relation to the axis 1. The remaining pairs of coil carriers 4, 5 and 6, 7 for supporting the coils of greater widths are arranged opposite to each other in pairs with respect to the winding axis 1 and are formed as hinged arms. These latter pairs of coil carriers are disposed in a lower horizontal position of rest while the first coil is being wound according to FIG. 1, and thus they do not interfere with the lateral feeding of the wire for winding the first inner coil on the pair of carriers 2, 3. After the first coil has been wound the pair of coil carriers 4, 5 (FIG.2) and after the winding of this pair has been completed the pair of coil carriers 6, 7 (FIG.3) are pivoted into their respective winding or operating position by a mechanism to be described later. In operating position all of the coil carriers 2 to 7 are disposed eccentrically of concentrically with respect to the winding axis 1 and in parallel relation to each other. Prior to pivoting a pair of coil carriers into operating position the winding operation is interrupted for a short time. The coils may be wound on the coil carriers with a single as well as a plurality of winding layers. The winding operation may be achieved in different manners. On the one hand the coil carriers 2 to 7 may be rotated together with their support, or the platform 8 respectively, while a non-rotatable winding arm or wire guide is guided vertically across the winding circumference of the coil carriers. Preferably the platform 8 is supported by rollers on a not illustrated base. On the other hand the coil carriers may also be arranged non-rotatably while the coil is wound by a rotating winding arm in a known manner.

Figure 4:
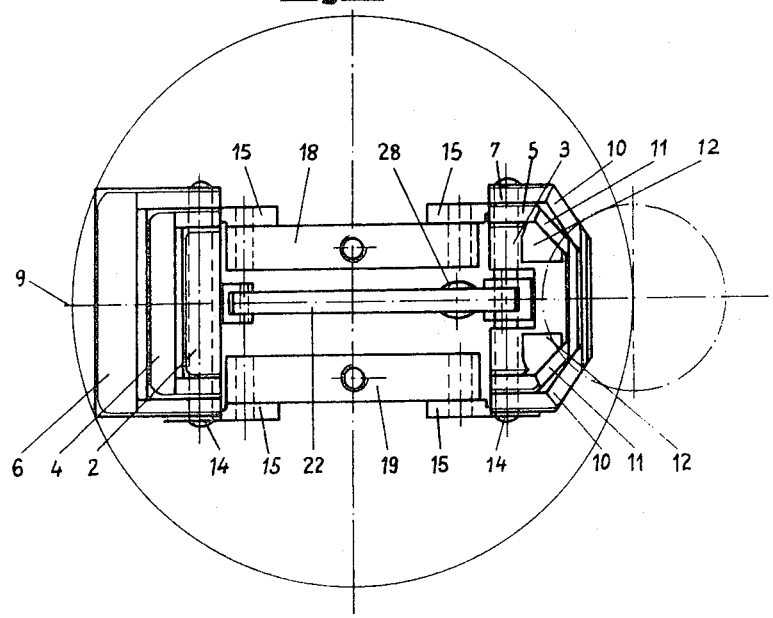
FIG. 4 is a top view of the apparatus shown in FIG. 3.
Figure 6:
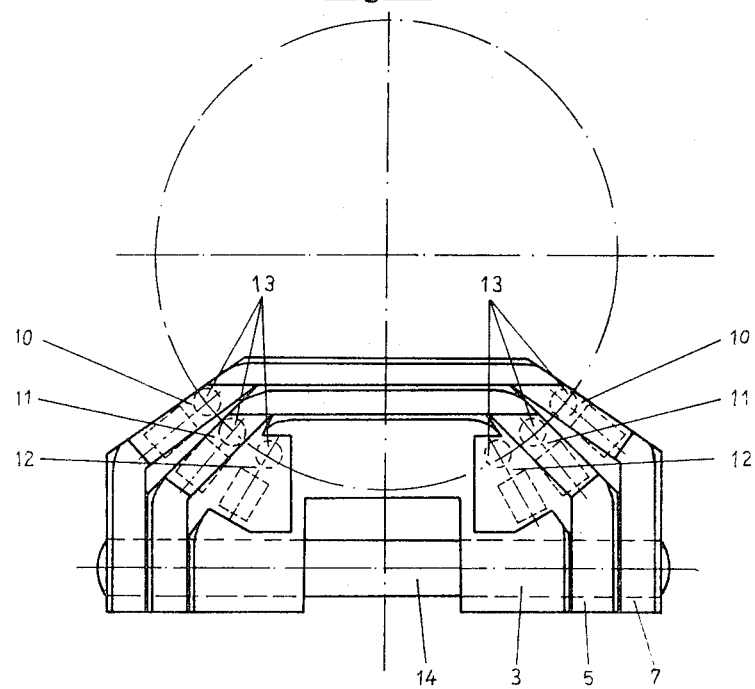
FIG. 6 is a partial top view of the apparatus showing the transition of the coils to the retracting device.

As is clearly shown in FIGS. 4 and 6 the coil carriers 3, 5 and 7 of the right hand group of coil carriers are provided with recesses 10, 11 and 12 extending homologously symmetrically with respect to the center line 9 and in operating position in parallel relation to the winding axis 1 vertically downwardly. The arrangements and widths of these top open recesses are chosen in such a way that, if viewed from the side, they form spaces between coils which remain free of coil wire during the winding operation. The wound coils engage the outwardly facing edges or surfaces defining the recesses. After all of the coils have been wound, in the present exemplified embodiment three coils, the holding fingers 13 of a known per se retraction device may be inserted from the top into the recesses 10, 11 and 12, which are disposed on a pitch circle. In this, corresponding coil sections in the zones of the recesses are automatically pushed between the holding fingers 13 so that, after the tension of the coil wires, which are firmly encompassing the coil carriers, is released, in a manner to be described later, all of the coils may be retracted in unison from the coil carriers to be mounted by the aid of the retraction device for example on the stator of an electrical machine in any suitable well known manner.

The pivoting operation of the respective pairs of coil carriers 4, 5, or 6, 7 respectively, into their winding positions is achieved by a mechanically acting lever system. An actuating lever 15 is rigidly connected with its one end to each pivotal coil, for example by screws and is pivotally supported on a trunnion or bolt 14. At their opposite ends the actuating levers 15 are each provided with an oblong hole 16 engaged by a pin 17. A traverse 18, or 19 respectively is provided for each pair of pivotal coil supports 4, 5 and 6, 7. A pin is mounted at each end of the traverses 18 and 19 extending into the oblong holes 16 of the actuating levers 15. These traverses are reciprocable in vertical direction, for example by pneumatic, hydraulic, electromagnetic or mechanical means. In the illustrated exemplified embodiment 20 demotes the end of a piston rod of a pneumatic or hydraulic cylinder which may be retracted downwardly or extended upwardly.

The pivoting movement of the pairs of coil carriers is achieved by moving the traverses 18, 19 downwardly with the aid of the piston rod 20. Due to this movement the pins 17 are also moved downwardly, thereby exerting a downwardly directed force on the outer ends of the actuating levers 16, whereby one pair of coil carriers is pivoted about the trunnions 14. The oblong holes 16 in the actuating levers 16 allow the relative movement between the pins 17 and the actuating levers 15.

Figure 2:
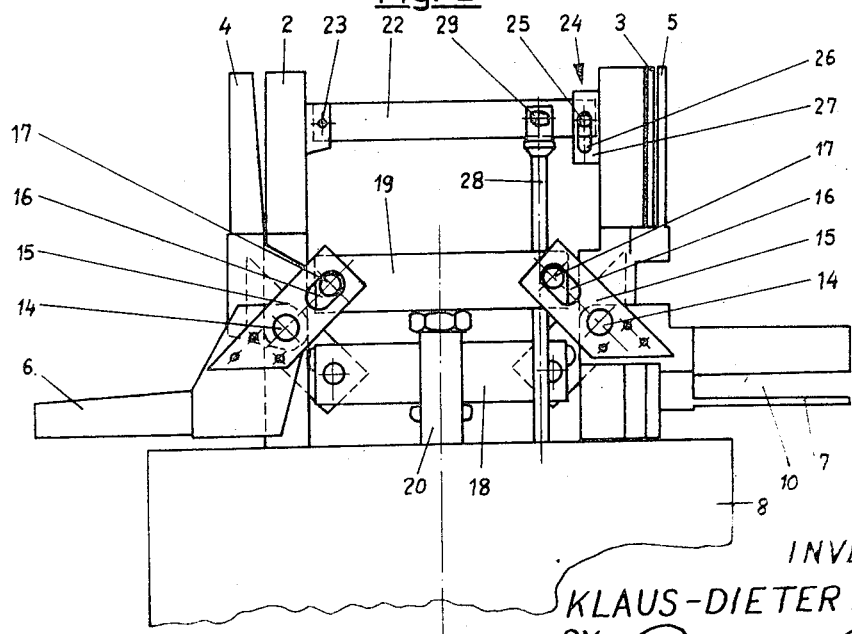
FIGS. 2 and 3 are similar views like FIG. 1 in which the first and also the second pair of coil carriers are pivoted into their winding position.
Figure 3:
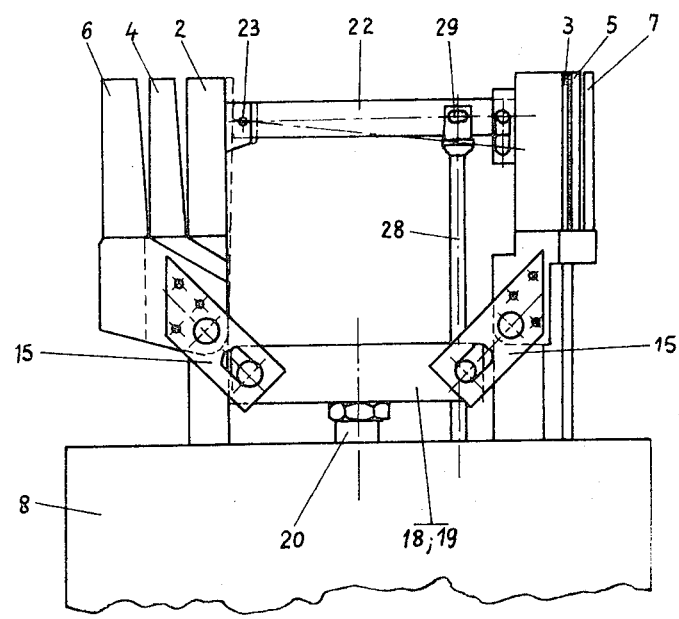

In the operating position shown in FIG. 1 the pivotal coil carriers are in positions of rest. In FIG. 2 the traverse 18 is shown to be pulled downwardly, whereby the coil carriers 4, 5 connected thereto by the actuating levers 15 are moved into operating positions ready for a coil to be wound thereon. After the coil has been wound on this pair of coil carriers, the traverse 19 is moved downwardly, whereby the pair of coil carriers 6, 7 are pivoted into the winding position shown in FIG. 3, in the same manner as described before, ready for a coil of the greatest width to be wound thereon.

For reasons of simplifying the construction each group of the coil carrier groups 4, 6 and 5, 7 disposed on opposite sides of the winding axis 1 is mounted on a common trunnion 14 mounted in the lower part of the coil carrier arms 2 and 3.

Figure 5:
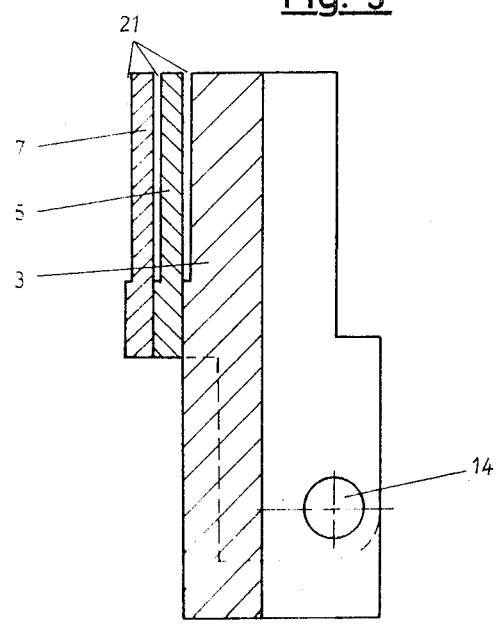
FIG. 5 is a sectional view of one group of coil carriers.

After all of the coils have been wound, and are disposed in the spaces between the coil carriers, or as clearly shown in FIG. 5, in the recesses 21 of the coil carriers the wires of the coils are under inwardly directed tension, thereby forcing them against the winding surfaces of the coil carriers. It would be difficult to retract the coils from the winding apparatus with the aid of the holding fingers 13 of the retraction device and would cause damages of the coils, or the wire insulation respectively, if an excessive pull would be exerted thereon. In order to prevent this, the distance between the groups of coils carriers 2, 4, 6 and 3, 5, 7 may be altered according to the invention. In the illustrated exemplified embodiment this is achieved by moving or pivoting the one group of coil carriers towards the other, whereby the distance is decreased and the tension is removed. As shown in FIG. 2a vertically adjustable transverse lever 22 engages with its two ends the sides of the inner coil carriers 2 and 3 which are facing the winding axis 1, and this in such a way that the left hand engagement point at the coil carrier 2 is formed by a fixed pivot 23 while the right hand engagement point at the coil carrier 3 is formed as a movable pivot 24. The pivot 23 is formed by a pin extending through the left hand end of the lever 22, and a projection suitably fixed to the coil carrier 2. The pivot 24 comprises a pin 25 fixed to the transverse lever 22 extending through a vertically extending oblong hole 26 formed in a projection 27 fixed to the coil carrier 3.

The change of the distance between the two groups of coil carriers is achieved by vertically reciprocating an adjustment rod 28 pivoted at 29 to the transverse lever 22 and extending substantially normally downwardly therefrom. The left hand group of coil carriers 2, 4, and 6 may be pivoted laterally as a unit about their common trunnion 14 in the direction of the transverse lever plane. The lateral pivoting movement of this group of coil carriers towards the right in order to decrease the distance between the coil carrier groups so as to release the tension of the wire is achieved in such a manner that with the aid of a suitable drive the adjustment rod 28 is pulled downwardly, whereby the transverse lever 22 is pivoted about the pivot 23, as shown in dashed lines in FIG. 3. By means of this the length of the lever 22 projected on the horizontal is decreased and a pull is exerted on both groups of coil carriers in a direction towards the winding axis, whereby the desired decreased distance and release of the wire tension is achieved, since the groups of coil carriers 2, 4, and 6 are pivoted through a small angle inwardly. In this connection it will be understood that the adjustment rod 28 may either be supported with its lower end for lateral pivotal movement at the platform 8, or it may be connected with its upper end to the transverse lever 22 by a pin and oblong hole connection to allow the relative movement of the thus moved members.

The winding apparatus according to the invention is advantageous due to its simplicity. At the end of the winding operation all of the coils automatically are in the proper position for the succeeding retraction operation, wherein the retraction device working with holding fingers may grip the finished coils after the tension of the wire has been released.

Finally, at should be noted that the number of the associated pairs of coil carriers is dependent on the number of concentric coils to be wound, and that, depending on the desired configuration of the coils also more than two groups of coil carriers may be provided, if the occasion arises.

I claim:

1. In an apparatus for winding concentrically disposed coils, or groups of coils respectively, for electric machines the combination of:

(a) a base structure; (b) coil carrier support means and wire guide means mounted on said base structure; (c) drive means rotating said support means and said wire guide means relative to each other; (d) a first pair of coil carriers for the coil of smallest width mounted stationarily on said support means and projecting therefrom in spaced relation at opposite sides of the axis of rotation having outer surfaces around which the wire is wound; (e) any required number of additional pairs of coil carriers, each pair for winding a coil of greater width and mounted pivotally on said support means in spaced relation on opposite sides of said axis of rotation movable successively in pairs out of a position of rest, in which they do not interfere with the winding of the preceding coil, into an operating position, in which the winding circumference of all coil carriers are disposed parallel to each other and to said axis of rotation; (f) actuating means for pivoting said additional pairs of coil carriers; (g) retraction means for removing said coils from said pairs of coil carriers engaging zones of each coil which remain exposed at their inner circumferences; (h) means for reducing the distance between said pairs of coil carriers, so as to release the winding tension of the coil wires and to facilitate the removal of the coils by said retraction means; and said coil carriers of one group disposed at one side of said axis of rotation having recesses formed therein open at their free ends and extending substantially in parallel relation to the winding surfaces and over the length thereof thereby forming free zones of exposed coil wires and spaces between said coils into which holding fingers of said retraction means are insertable.

2. An apparatus as claimed in claim 1, and another group of coil carriers at the opposite side of the axis of rotation and similarly constructed to the one group of coil carriers, said actuating means for pivoting said additional pairs of coil carriers include a compound lever arrangement comprising an arm fixed to each additional coil carrier so as to form a bellcrank lever, each group disposed at either side of said axis of rotation being pivotal about a pin carried by said support means and the free ends of said arms of each pair of the additional coil carriers being pivotally engaged by the ends of a cross member extending therebetween each cross member being engaged by powered drive means for effecting reciprocating movement thereof.

3. An apparatus as claimed in claim 2, wherein the pivotal connection between said bellcrank lever arms and said cross members are formed by oblong holes formed in the one members and a pin extending therethrough fixed in the other members.

4. An apparatus as claimed in claim 2, wherein said powered drive means are formed by jack means such as pneumatic or hydraulic cylinders or elctromagnets.

5. An apparatus as claimed in claim 2, wherein said coil carriers of the pair for winding the smallest coil have a hole formed in their base parts through which said pivot pin for each pair of additional coil carriers extends.

6. An apparatus as claimed in claim 1, wherein said means for reducing the distance between the pairs of coil carriers include means for moving one group of coil carriers disposed at one side of said axis of rotation towards the other group of coil carriers disposed at the other side of said axis of rotation.

7. An apparatus as claimed in claim 6, wherein said means for reducing the distance between said pairs of coil carriers includes a lever extending transversely and connecting the free ends of the pair of coil carriers for the coil of smallest width which carries the groups of additional coil carriers, one coil carrier having a pivot bearing provided at its lower end allowing to pivot that group of coil carriers in longitudinal direction of said lever which is movable substantially in the direction of the axis of rotation, one end of said lever being pivoted to the one coil carrier at a fixed location while the other end of said lever is connected to the other coil carrier by a movable articulated joint.

8. An apparatus as claimed in claim 7, wherein said movable bearing is formed by a pin and oblong hole connection.

9. An apparatus as claimed in claim 7, wherein a power operated rod engages said levers.

* * * * *